United States Patent
VanBlon et al.

(10) Patent No.: US 10,922,862 B2
(45) Date of Patent: Feb. 16, 2021

(54) PRESENTATION OF CONTENT ON HEADSET DISPLAY BASED ON ONE OR MORE CONDITION(S)

(71) Applicant: Lenovo (Singapore) Pte. Ltd., Singapore (SG)

(72) Inventors: Russell Speight VanBlon, Raleigh, NC (US); Nathan J. Peterson, Oxford, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 50 days.

(21) Appl. No.: 15/946,388

(22) Filed: Apr. 5, 2018

(65) Prior Publication Data

US 2019/0311512 A1    Oct. 10, 2019

(51) Int. Cl.
| | | |
|---|---|---|
| *G06T 11/60* | (2006.01) | |
| *G06K 9/00* | (2006.01) | |
| *G06F 3/14* | (2006.01) | |
| *G02B 27/01* | (2006.01) | |
| *G06F 3/16* | (2006.01) | |
| *G06F 3/01* | (2006.01) | |

(52) U.S. Cl.
CPC .......... *G06T 11/60* (2013.01); *G02B 27/0172* (2013.01); *G02B 27/0179* (2013.01); *G06F 3/013* (2013.01); *G06F 3/017* (2013.01); *G06F 3/1454* (2013.01); *G06F 3/167* (2013.01); *G06K 9/00671* (2013.01); *G02B 2027/014* (2013.01); *G02B 2027/0138* (2013.01); *G02B 2027/0187* (2013.01)

(58) Field of Classification Search
CPC . G06T 11/60; G02B 27/0172; G02B 27/0179; G02B 2027/0138; G02B 2027/014; G02B 2027/0187; G06F 3/013; G06F 3/017; G06F 3/1454; G06F 3/167; G06K 9/00671
See application file for complete search history.

(56) References Cited

U.S. PATENT DOCUMENTS

| | | |
|---|---|---|
| 9,875,075 B1 | 1/2018 | VanBlon et al. |
| 2012/0206452 A1 | 8/2012 | Geisner et al. |
| 2012/0249741 A1 | 10/2012 | Maciocci et al. |
| 2013/0208014 A1 | 8/2013 | Fleck et al. |
| 2013/0235073 A1 | 9/2013 | Jaramillo et al. |

(Continued)

OTHER PUBLICATIONS

Russell Speight Vanblon, Arnold S. Weksler, Nathan J. Peterson, John Carl Mese, "Presentation of Content on a Video Display and a Headset Display", file history of related U.S. Appl. No. 15/218,694, filed Jul. 25, 2016.

(Continued)

*Primary Examiner* — Christopher E Leiby
(74) *Attorney, Agent, or Firm* — John M. Rogitz; John L. Rogitz (57) ABSTRACT

In one aspect, a headset includes a housing, a processor coupled to the housing, an at least partially transparent first display coupled to the housing and accessible to the processor, and storage coupled to the housing and accessible to the processor. The storage includes instructions executable by the processor to identify at least one condition and to present, based on identification of the at least one condition, content on the first display that is already presented on a second display.

20 Claims, 7 Drawing Sheets

(56) References Cited

U.S. PATENT DOCUMENTS

| | | |
|---|---|---|
| 2013/0241948 A1 | 9/2013 | Kimura |
| 2013/0250086 A1 | 9/2013 | Mar et al. |
| 2014/0292638 A1 | 10/2014 | Lee |
| 2015/0220506 A1* | 8/2015 | Parkinson ............ G06F 40/169 715/231 |
| 2015/0264529 A1 | 9/2015 | Cho |
| 2016/0034245 A1* | 2/2016 | Karunakaran ........ G06F 3/1407 345/2.2 |
| 2016/0162082 A1 | 6/2016 | Schwesinger et al. |
| 2016/0292922 A1 | 10/2016 | Kasahara |
| 2016/0350057 A1 | 12/2016 | Kwon et al. |
| 2017/0010849 A1* | 1/2017 | Deng .................... G06F 3/1454 |
| 2017/0344124 A1 | 11/2017 | Douxchamps et al. |
| 2018/0075659 A1* | 3/2018 | Browy .................. G06T 19/006 |
| 2019/0011703 A1* | 1/2019 | Robaina ................ G02B 27/01 |
| 2019/0139514 A1 | 5/2019 | Resudek et al. |
| 2019/0163963 A1 | 5/2019 | Minnick et al. |

OTHER PUBLICATIONS

Russell Speight Vanblon, John Carl Mese, Nathan J. Peterson, "Presentation of Content at Headset Display Based on Other Display Not Being Viewable", file history of related U.S. Appl. No. 15/946,242, filed Apr. 5, 2018.

John Weldon Nicholson, Howard Jeffrey Locker, Daryl C. Cromer, "Systems and Methods to Change Setting Related to Presentation of Content Based on User Squinting and/or User Blink Rate", file history of related U.S. Appl. No. 16/369,945, filed Mar. 29, 2019.

Russell Speight Vanblon, John Carl Mese, Nathan J. Peterson, "Presentation of Content at Headset Display Based on Other Display Not Being Viewable", related U.S. Appl. No. 15/946,242, Non-Final Office Action dated Jun. 14, 2019.

Russell Speight Vanblon, John Carl Mese, Nathan J. Peterson, "Presentation of Content at Headset Display Based on Other Display Not Being Viewable", related U.S. Appl. No. 15/946,242, Applicant's response to Non-Final Office Action filed Aug. 6, 2019.

VanBlon et al., "Presentation of Content at Headset Display Based on Other Display Not Being Viewable", related U.S. Appl. No. 15/946,242, Final Office Action dated Aug. 23, 2019.

Russell Speight Vanblon, John Carl Mese, Nathan J. Peterson, "Presentation of Content at Headset Display Based on Other Display Not Being Viewable", related U.S. Appl. No. 15/946,242, Applicant's response to Final Office Action filed Nov. 20, 2019.

Russell Speight Vanblon, John Carl Mese, Nathan J. Peterson, "Presentation of Content at Headset Display Based on Other Display Not Being Viewable", related U.S. Appl. No. 15/946,242, Applicant's response to Final Office Action filed Jan. 20, 2020.

Russell Speight Vanblon, John Carl Mese, Nathan J. Peterson, "Presentation of Content at Headset Display Based on Other Display Not Being Viewable", related U.S. Appl. No. 15/946,242, Non-Final Office Action dated Apr. 22, 2020.

Russell Speight Vanblon, John Carl Mese, Nathan J. Peterson, "Presentation of Content at Headset Display Based on Other Display Not Being Viewable", related U.S. Appl. No. 15/946,242, Applicant's response to Non-Final Office Action filed Jul. 22, 2020.

Nicholson et al., "Systems and Methods to Change Setting Related to Presentation of Content Based on User Squinting and/or User Blink Rate", related U.S. Appl. No. 16/369,945, Non-Final Office Action dated Jun. 5, 2020.

Nicholson et al., "Systems and Methods to Change Setting Related to Presentation of Content Based on User Squinting and/or User Blink Rate", related U.S. Appl. No. 16/369,945, Applicant's response to Non-Final Office Action filed Aug. 8, 2020.

* cited by examiner

PRESENTATION OF CONTENT ON HEADSET DISPLAY BASED ON ONE OR MORE CONDITION(S)

BACKGROUND

As recognized herein, viewing a display of an electronic device that is located at a relatively great distance from a user can make it difficult to discern content that is presented on the display. There are currently no adequate solutions to the foregoing computer-related, technological problem.

SUMMARY

Accordingly, in one aspect a headset includes a housing, at least one processor coupled to the housing, an at least partially transparent first display coupled to the housing and accessible to the at least one processor, and storage coupled to the housing and accessible to the at least one processor. The storage includes instructions executable by the at least one processor to identify at least one condition and to present, based on identification of the at least one condition, content on the first display that is already presented on a second display different from the first display.

In another aspect, a method includes identifying at least one factor related to a first display of a first device on which visual content is being presented. The method also includes presenting, based on identifying the at least one factor, the visual content on a second, at least partially transparent display of a headset.

In still another aspect, an apparatus includes a first processor, a network adapter, and storage bearing instructions executable by a second processor of a headset for identifying at least one circumstance. The instructions are also executable for presenting, based on identifying the at least one circumstance, visual content on a first display of the headset, with the visual content being concurrently presented on a second display of a second device different from the headset. The first processor transfers the instructions to the second processor over a network via the network adapter.

The details of present principles, both as to their structure and operation, can best be understood in reference to the accompanying drawings, in which like reference numerals refer to like parts, and in which:

DETAILED DESCRIPTION

The present application relates to "zooming" into content that is already presented on a screen/display that is too far away from a headset user to read. For example, when the user looks across a room at a digital assistant device's display that is too far away for the user to adequately view the content presented on the display, the headset may use its own display to present a legible and/or zoomed-in version of the content that is already presented on the other display.

Packets for the content may be transferred electronically between the headset and other device if the two devices have been previously linked, such as through Bluetooth pairing or the granting of access permissions. Thus, presenting the content from the other device on the headset's display may allow the content to be presented on the headset's display in "non-degraded" form, as opposed to simply using a camera to zoom in on the far-away display.

The foregoing may be initiated, for example, when the user looks at the far-away display for a predefined time period, if the user squints while looking at the far-away display, as soon as the user looks at the far-away display when text is too small, when a predetermined hand or head gesture is performed while looking at the far-away display, when the far-away display is in relative proximity but the user is not looking at it, etc.

Once content is "zoomed in" on by being presented on the headset's display, the content may continue to be presented until the headset identifies another circumstance as occurring, such as the user providing a command to cease presenting the content on the headset's display.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
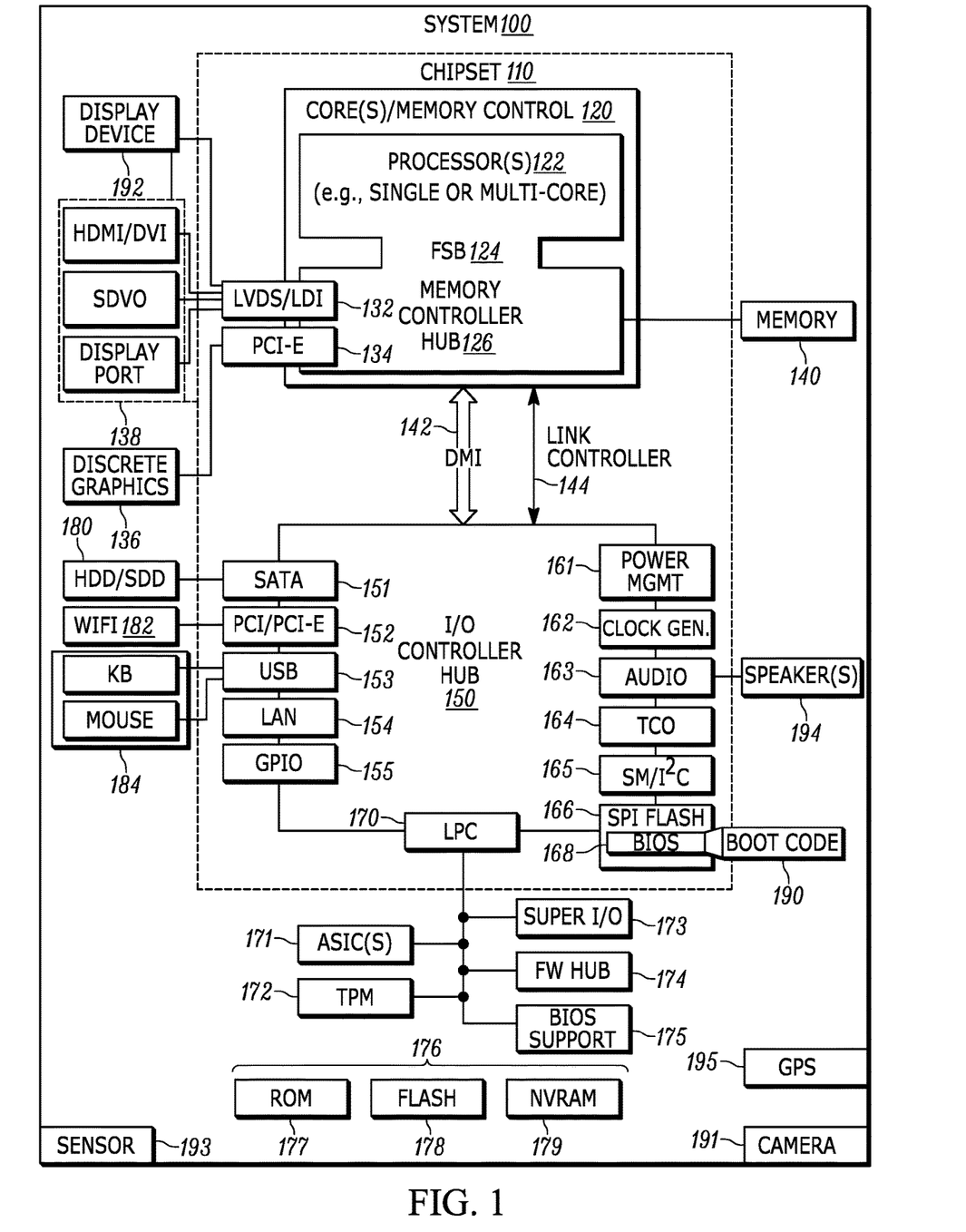
FIG. 1 is a block diagram of an example system in accordance with present principles.

As shown in FIG. 1, the system 100 may include a so-called chipset 110, chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information e.g., data, signals, commands, etc. for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LTC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include a camera 191 that may gather one or more images and provide them and related input to the processor 122. The camera may be a thermal imaging camera, a digital camera such as a webcam, a three-dimensional (3D) camera, an infrared (IR) camera and/or a camera otherwise integrated into the system 100 and controllable by the processor 122 to gather pictures/images and/or video.

The system 100 may also include one or more additional sensors 193 such as an audio receiver/microphone that may provide input from the microphone to the processor 122 based on audio that is detected, such as via a user providing audible input to the microphone. The sensors 193 may also include, for example, an infrared (IR) proximity sensor, a photoelectric proximity sensor, an ultrasound proximity sensor, etc.

Still further, the system 100 may include a GPS transceiver 195 that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

Though not shown for simplicity, in some embodiments the system 100 may further include a gyroscope that senses and/or measures the orientation of the system 100 and provides input related thereto to the processor 122, as well as an accelerometer that senses acceleration and/or movement of the system 100 and provides input related thereto to the processor 122.

It is to be understood that an example client device or other machine/computer may include fewer or more features than shown on the system 100 of FIG. 1. In any case, it is to be understood at least based on the foregoing that the system 100 is configured to undertake present principles.

Figure 2:
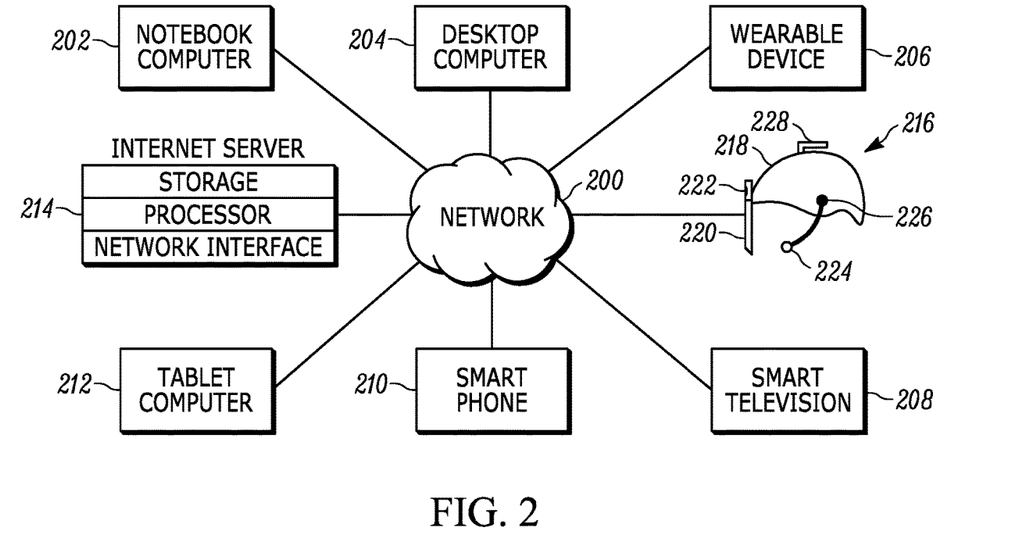
FIG. 2 is a block diagram of an example network of devices in accordance with present principles.

Turning now to FIG. 2, example: devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212 and 216. It is to be understood that the devices 202-216 are configured to communicate with each other over the network 200 to undertake present principles.

Describing the headset 216 in more detail, it may be a virtual reality (VR) headset in some examples, an augmented reality (AR) headset in other examples, Internet-enabled computerized glasses in still other examples, etc. The headset 216 may include a housing 218 to which an at least partially transparent display 220 is coupled for presenting visual content in accordance with present principles. The at least partially transparent display 220 may be a heads-up display and may permit a wearer of the headset to view real-world objects through it while wearing the headset 216, while also being configured to present content on the display 220 itself such as images, videos web pages, documents, etc.

The headset 216 may also include plural cameras 222 that may each be similar in function and configuration to the camera 191 described above, with at least one of the cameras 222 oriented to image a wearer's eyes when wearing the headset 216 for eye tracking as described herein and another of the cameras 222 being oriented away from the headset 216 to image other objects and also gestures of the wearer. The headset 216 may also include a microphone 224 that may be similar in function and configuration to the microphone 193, a speaker 226 that may be similar in function and configuration to the speaker(s) 194, and one or more head-engagement members 228 for a user to dispose the headset 216 on his or her head. Though not shown for clarity, it is to be understood that the headset 216 may also include a network interface for wired and/or wireless communication with the other devices of FIG. 2 such as via the Internet, a local area network (LAN), a Bluetooth network, etc.

Figure 3:
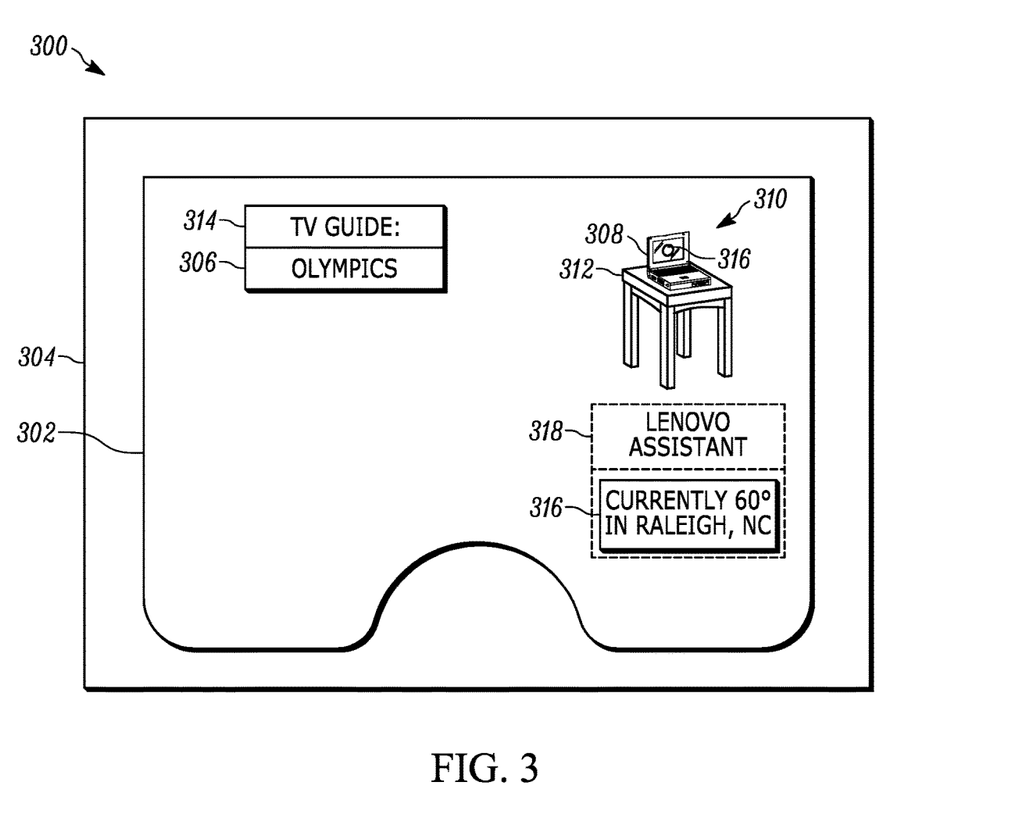
FIG. 3 is an example illustration in accordance with present principles.

Referring to FIG. 3, it shows an example illustration 300 from the perspective of a user while wearing a headset, such as the headset 216. The user is understood to be viewing his or her surroundings through an at least partially transparent heads-up display 302 of the headset. In this example, the user's surroundings are the living room 304 of a personal residence. A television (TV) 306 is disposed within the living room along with a personal assistant device 308 that has its own video display 310. The personal assistant device 308 is shown as being disposed on a coffee table 312.

Graphical objects such as text 314 are shown as presented on the TV 306, while another graphical object 316 is presented on the display 310 of the personal assistant device 308. The graphical object 316 in this example is a weather icon that shows information related to the current weather in Raleigh, N.C.

In accordance with the principles set forth herein, the text 314 need not be presented using the display 302 since it is of sufficient size to be legible by the user from the user's current geographical position relative to the TV 306 while viewing the TV 306 through the display 302. However, the object 316 as presented on the display 310 is too small to be discerned by the user from the user's current position relative to the device 308. Thus, the headset display 302 may detect that the object 316 cannot be discerned and, in response to detecting as much, may concurrently present same content 316 using the display 302. The headset may also control the display 302 to present an indicator 318 identifying the other device besides the headset that is presenting the same visual content, which in this case the device 308 as designated by the name "Lenovo Assistant". The name may have been designated during a network setup process for the device 308 or at a later time. In other examples, the name may have been indicated in network metadata for the device 308 as created by a manufacturer of the device 308.

Note that although the content 316 and indicator 318 may both be presented on the headset display 302 using augmented reality software, present principles may be implemented using other three-dimensional (3D) graphics rendering software such as virtual reality (VR) graphics rendering software. Other visual content to be described below may also be presented on a headset's display using the same software/software types.

Figure 4:
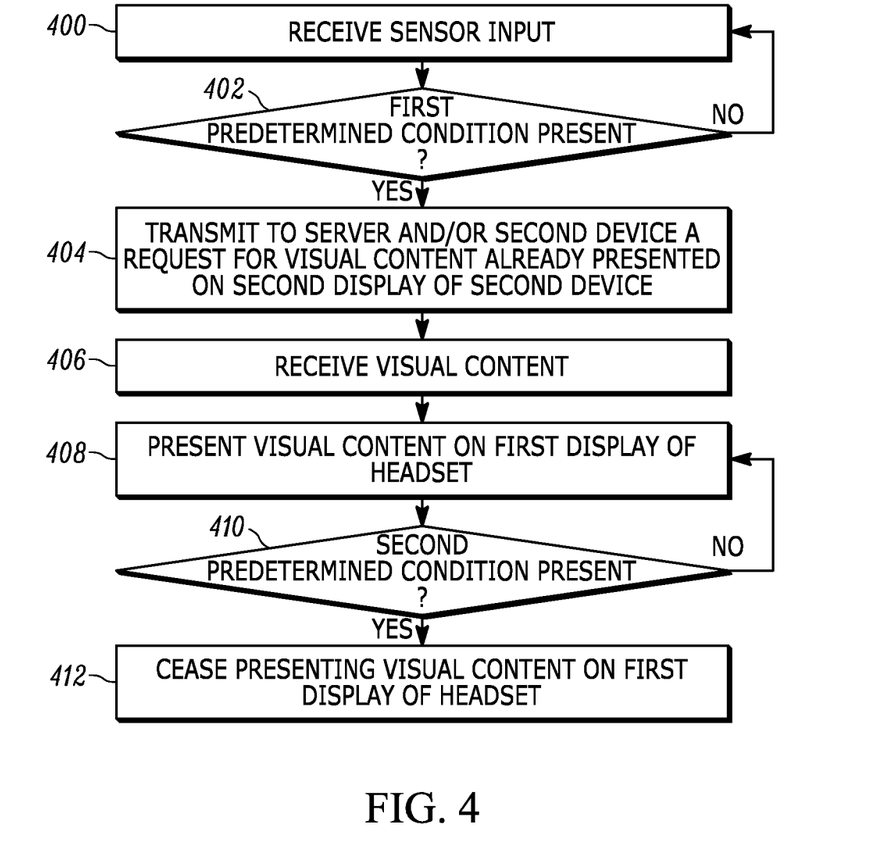
FIGS. 4-13 are flow charts of example algorithms in accordance with present principles.

Reference is now made to FIG. 4, which shows example overall logic that may be executed by a device such as one of the headsets described herein, or another device in communication with the headset. Beginning at block 400, the headset may receive input from one or more sensors. The sensors may be located on the headset itself, located on other devices in communication with the headset (e.g., Bluetooth or Wi-Fi communication), or located within the user's current surroundings in an Internet of things environment. Examples of sensors from which the input may be received include cameras, microphones, infrared proximity sensors, laser rangefinders, and GPS transceivers.

From block 400 the logic may proceed to decision diamond 402, where the headset may determine whether at least a first predetermined condition, factor, and/or circumstance exists (referred to below simply as a "condition" for simplicity). Examples of such conditions will be discussed below in reference to FIGS. 5-10. A negative determination at diamond 402 may cause the logic to revert back to block 400 and proceed therefrom. However, an affirmative determination at diamond 402 may instead cause the logic to proceed to block 404.

At block 404 the headset may transmit a request for visual content that is already presented on a second display of a second device different from the headset, with it being understood that the first display is located on the headset itself. The request may be for visual content to be streamed or otherwise provided to the headset from the second device or from a third device, such as a server that might already be providing the visual content to the second device. The request may be transmitted via Bluetooth communication, Wi-Fi Internet communication, wired Internet communication, or another type of communication.

From block 404 the logic may then move to block 406, where the headset may receive the visual content concurrently being presented on the second display or that will be concurrently presented on both displays once synced using timing data received from the providing device. From block 406 the logic may then proceed to block 408 where the visual content may in fact be presented on the first display of the headset. If the content is static content that will not change in presentation until a user's action or another event, the content itself may simply be concurrently presented on both displays.

However, if the content is non-static content such as a video, the content may be synchronized for presentation on both displays owing to respective same frames of the content being simultaneously streamed from a third device to both the headset and the second device. Additionally, or alternatively, regardless of from which device the visual content is received (the second device or the server), timing data may also be received with the visual content at block 406 that specifies particular times at which respective frames of the visual content are to be presented to sync with the same respective frames as also presented on the second display.

From block 408 the logic may then proceed to decision diamond 410. At diamond 410 the headset may determine whether at least a second predetermined condition exists. Responsive to an affirmative determination that at least one such condition exists; the logic may move to block 412 and cease presenting the visual content on the first display of the headset. However, responsive to a negative determination at diamond 410, the logic may instead revert back to block 408 and continue presenting the visual content on the first display. Examples of predetermined conditions that may result in an affirmative determination at diamond 410 will be discussed below in reference to FIGS. 11-13.

In reference to all of FIGS. 5-13, it is to be understood that the logic of these figures may be executed in conjunction with the logic of FIG. 4. For instance, the decision at the respective decision diamonds in each of FIGS. 5-10 may be made at decision diamond 402 as described above, while the decision at the respective decision diamonds in each of FIGS. 11-13 may be made at decision diamond 410.

Figure 5:
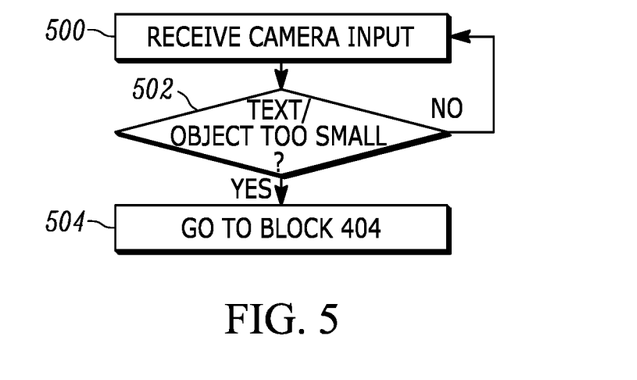

Now specifically in reference to FIG. 5, it shows example logic that may be executed by the headset to determine whether to request and present visual content on its display (the first display) that is already being presented on a second display of a second device as described herein. Beginning at block 500, the headset may receive input from a camera on the headset that is oriented forward and away from the headset to collect images of the user's surroundings from the perspective of the user while wearing the headset. In this example, the images of user's surroundings are understood to show the second display of the second device that is presenting text or other graphical objects.

The logic may then proceed to decision diamond 502 where the headset may determine whether the text or other graphical objects are too small for viewing. This may be done by analyzing the input from the camera using object recognition software to determine whether the text presented on the second display is smaller than a predetermined text size, as observed from the headset based on the input from the camera. For example, if each recognized letter of the text is less than a threshold height and threshold width in camera pixels or image pixels, an affirmative determination may be made. As another example, if each recognized letter of the text occupies less than a threshold area in camera pixels or image pixels, an affirmative determination may be made.

The determination at diamond 502 may also be performed by the headset by analyzing the input from the camera using optical character recognition (OCR) software to determine whether the text presented on the second display can be recognized using OCR. If the text cannot be recognized using OCR, a negative determination may be made at diamond 502, while an affirmative determination may be made if the text is recognized using OCR.

Additionally, in some examples the headset may communicate with the second device to receive the text as presented on the second display and compare that text to what the headset recognizes, using OCR, as text from the camera input. If a text match to within a threshold confidence level is made between the two, an affirmative determination may be made at diamond 502. If not, then a negative determination may be made at diamond 502.

The determination at diamond 502 may also be performed by the headset by analyzing the input from the camera using object recognition software to identify whether an icon or other non-text graphical object presented on the second display is below a threshold size, as observed from the headset based on the input from the camera. For example, if an icon or other object is less than a threshold height and threshold width in camera pixels or image pixels, an affirmative determination may be made. As another example, if each icon or other object occupies less than a threshold area in camera pixels or image pixels, an affirmative determination may be made.

Based on an affirmative determination at diamond 502, the logic of FIG. 5 may proceed to block 504. At block 504 the headset may perform the function of block 404, namely, transmitting a request for the visual content. However, based on a negative determination at diamond 502, the logic may revert back to block 500 and again proceed therefrom.

Figure 6:
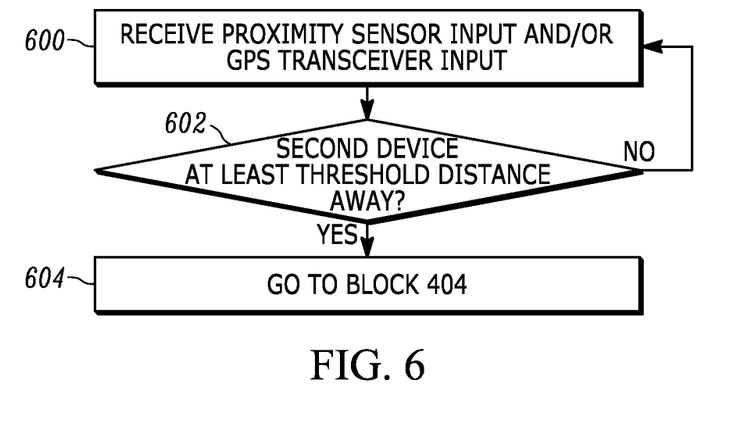

Continuing the detailed description in reference to FIG. 6, it also shows example logic that may be executed by the headset to determine whether to request and present visual content on its display that is already being presented on a second display of a second device as described herein. Beginning at block 600, the headset may receive input from a proximity sensor such as a camera, an infrared (IR) proximity sensor, a laser rangefinder, etc. The logic may then proceed to decision diamond 602 where the headset may determine, based on the input received at block 600, whether the second device is at least a threshold non-zero distance away from the headset (such as 10 feet or another distance specified by the user). If the input is from a camera, spatial analysis software may be used to determine at diamond 602 whether the second device as shown in an image from the camera is more than a threshold distance away based on the size of the second device as appearing in the image and the known location of the second device.

If the input is from an IR proximity sensor or a laser rangefinder on the headset or another device in communication with the headset, data from either of those sensors that indicates the distance from the headset to the second device may be used at diamond 602 to determine whether the second device is more than the threshold distance away from the headset.

Additionally, or alternatively, the headset may receive GPS coordinates from a GPS transceiver on the headset and may also receive GPS coordinates from the second device that indicate a current location of the second device. Then, based on the known locations for the headset and second device, the headset may identify a distance between the two and determine whether the second device is at least the threshold distance away at diamond 602.

Based on an affirmative determination at diamond 602, the logic of FIG. 6 may proceed to block 604. At block 604 the headset may perform the function of block 404, namely, transmitting a request for the visual content. However, based on a negative determination at diamond 602, the logic may revert back to block 600 and again proceed therefrom.

Figure 7:
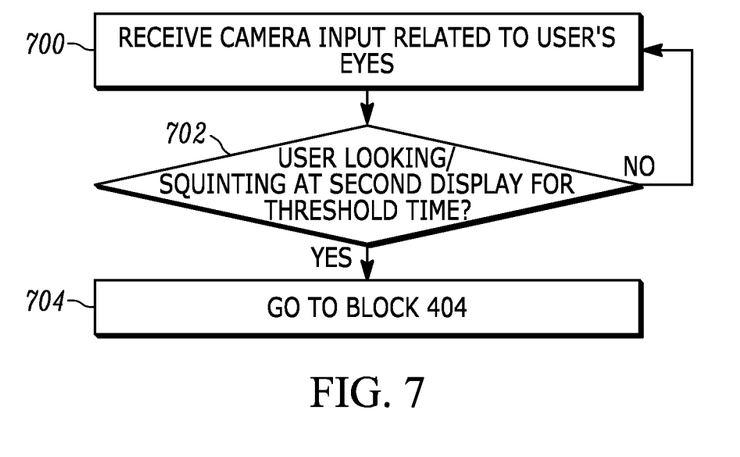

Now in reference to FIG. 7, it also shows example logic that may be executed by the headset to determine whether to request and present visual content on its display that is already being presented on a second display of a second device as described herein. Beginning at block 700, the headset may receive input from a camera located on the headset that is oriented inward on the headset to gather images of the headset user's eyes while the user wears the headset. The logic may then proceed to block 702 where the headset may determine whether the user is squinting or gazing at the second display for a threshold non-zero amount of time, such as three seconds. Looking at the second display may be determined by analyzing the images from the camera using eye tracking software to identify eye gaze direction and depth based on pupil size and location. Squinting may be determined by analyzing the images from the camera using eye tracking software to identify gestures, muscle position, and muscle movements of tissue surrounding the eyes to determine whether those things match predetermined characteristics identifiable as squinting. Once looking or squinting has been initially identified, a timer may be initiated at the headset to determine whether the user looks or squints uninterrupted for at least the threshold non-zero amount of time.

Based on an affirmative determination at diamond 702, the logic of FIG. 7 may proceed to block 704. At block 704 the headset may perform the function of block 404, namely, transmitting a request for the visual content. However, based on a negative determination at diamond 702, the logic may revert back to block 700 and again proceed therefrom.

Figure 8:
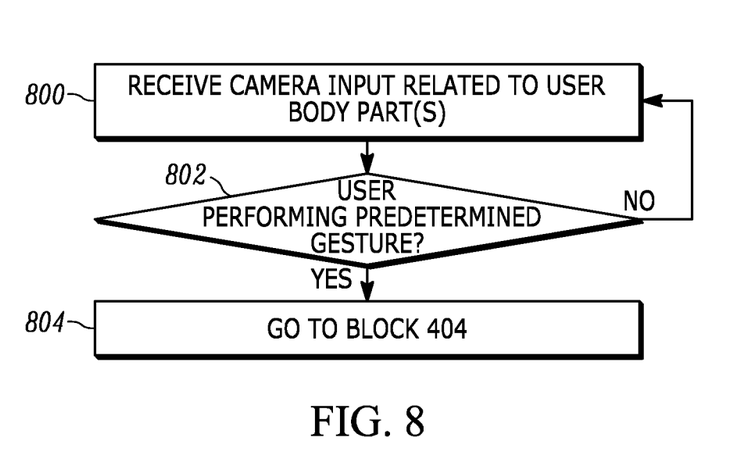

Continuing the detailed description in reference to FIG. 8, it shows example logic that may be executed by the headset to determine whether to request and present visual content on its display that is already being presented on a second display of a second device as described herein. Beginning at block 800, the headset may receive input from a camera, such as one that is located in the user's surroundings and that is in communication with the headset. The camera may also be on the headset or the second device. If the camera is located on the headset, it may be oriented forward and away from the headset. In this example, the camera(s) collects images of the user's arms while the user wears the headset and gestures a predetermined gesture with the user's arms and/or hands.

The logic may then proceed to decision diamond 802 where the headset may determine whether the user is in fact performing a predetermined gesture using the user's arms, hands, head, or other body parts. The headset may do so by analyzing the images from the camera(s) using gesture recognition software to determine whether the user is gesturing a predefined gesture recognizable by the headset as being a command for content from another display (or the second display in particular) to be presented on the first display of the headset.

Based on an affirmative determination at diamond 802, the logic of FIG. 8 may proceed to block 804. At block 804 the headset may perform the function of block 404, namely, transmitting a request for the visual content. However, based on a negative determination at diamond 802, the logic may revert back to block 800 and again proceed therefrom.

Figure 9:
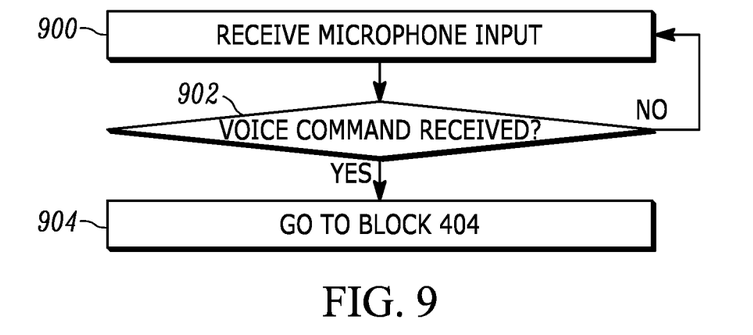

Reference is now made to FIG. 9, which also shows example logic that may be executed by the headset to determine whether to request and present visual content on its display that is already being presented on a second display of a second device as described herein. Beginning at block 900, the headset may receive input from a microphone, such as one disposed in the user's surroundings and in communication with the headset. The microphone may also be located on the headset or on the second device.

The logic may then proceed to decision diamond 902 where the headset may determine whether a voice command has been received from the user to present visual content on the first display of the headset that is already presented on the second display of the second device. The headset may do so by analyzing the input from the microphone using voice recognition software to determine whether such a command has been received. In some embodiments, the input may be analyzed to determine that a command has been provided along with information that identifies the second device as being the device from which content is to be mirrored on the first device. The second device may be verbally identified by the user by network ID, a user-designated device name, by a unique watermark or QR code or other code presented on the second display, etc. For example, the user may provide a voice command to "show me the visual content presented on the Lenovo Assistant's display".

Based on an affirmative determination at diamond 902, the logic of FIG. 9 may proceed to block 904. At block 904 the headset may perform the function of block 404, namely, transmitting a request for the visual content. However, based on a negative determination at diamond 902, the logic may revert back to block 900 and again proceed therefrom.

Figure 10:
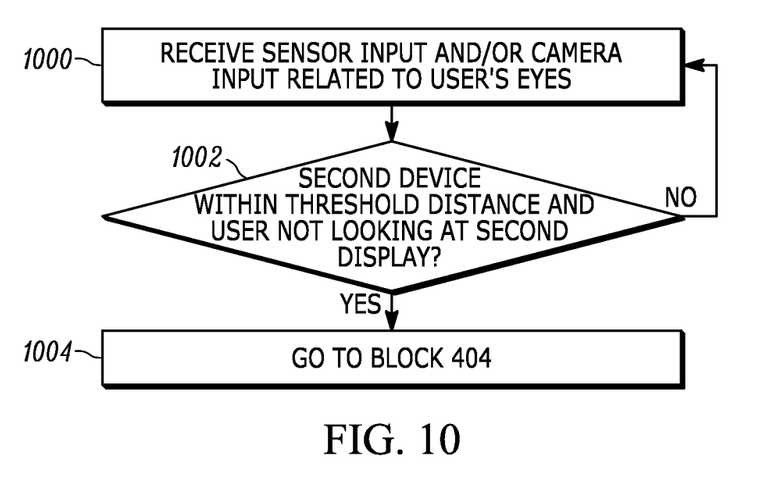

Continuing the detailed description in reference to FIG. 10, it also shows example logic that may be executed by the headset to determine whether to request and present visual content on its display that is already being presented on a second display of a second device as described herein. Beginning at block 1000, the headset may receive input from a camera. Also, at block 1000, the headset may receive input from a proximity sensor such as an infrared (IR) proximity sensor, a laser rangefinder, one or more GPS transceivers to determine a distance between the first and second devices based on the input. The camera itself from which the input is received may be located on the headset and oriented inward to gather images of the headset user's eyes while the user wears the headset.

The logic of FIG. 10 may then proceed to decision diamond 1002 where the headset may determine, based on the proximity sensor input, whether the second device having the second display is within a threshold non-zero distance to the user (such as three feet) and may also determine, by analyzing the input from the camera using eye tracking software, whether the user is looking at the second display. Responsive to determining that the second device is within the threshold non-zero distance but that the user is not looking at the second display, the logic may proceed to block 1004 where the headset may transmit a request for the visual content. However, responsive to determining one or both that the second device is not within the threshold non-zero distance or that the user is looking at the second display, the logic may revert back to block 1000 and again proceed therefrom.

Examples of predetermined conditions that may result in an affirmative determination at diamond 410 will now be discussed in reference to FIGS. 11-13. For each of FIGS. 11-13, it may be assumed that visual content is already being presented on the first display of the headset and that the determinations made in these respective figures pertain to whether to cease presenting visual content on the first display of the headset.

Figure 11:
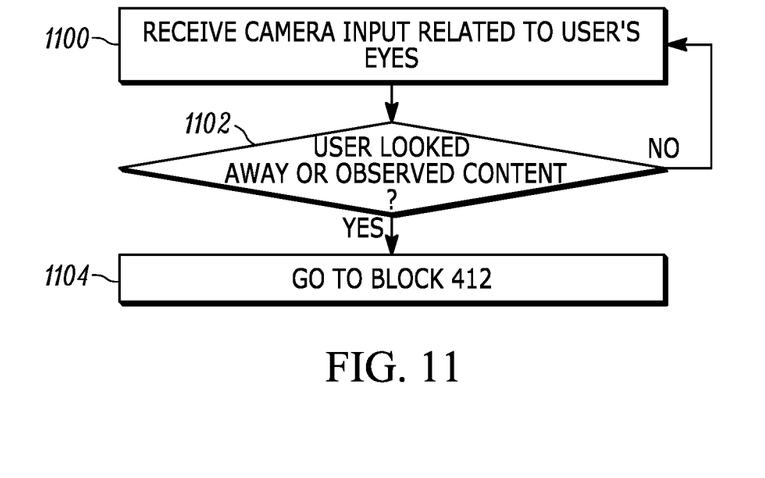

Beginning first with FIG. 11, at block 1100 the headset may receive input from a camera located on the headset and oriented inward to gather images of the headset user's eyes while the user wears the headset. The logic may then proceed to block 1102 where the headset may determine whether the user has looked away from the visual content as presented on the first display and/or whether the user has already observed the visual content as presented on the first display. The foregoing may be determined by analyzing the images from the camera using eye tracking software to identify eye gaze direction and depth based on pupil size and location to track the user's eye movements.

Determining whether the user has looked away from the visual content may be performed by identifying whether the user is focusing on the visual content as presented on the first display or has looked elsewhere on or through the first display. Determining whether the user has observed the content may be performed by tracking the user's eye movements to identify portions of the first display at which the user is looking and whether any of the visual content is presented at that portion so that, once the user looks at all portions of the first display presenting visual content, it may be determined that the user has observed the content.

Responsive to an affirmative determination at diamond 1102, the logic may proceed to block 1104. At block 1104 the headset may perform the function of block 412, namely, ceasing to present the visual content on the first display. However, responsive to making a negative determination at diamond 1102, the logic may revert back to block 1100 and again proceed therefrom while the visual content continues to be presented on the first display.

Figure 12:
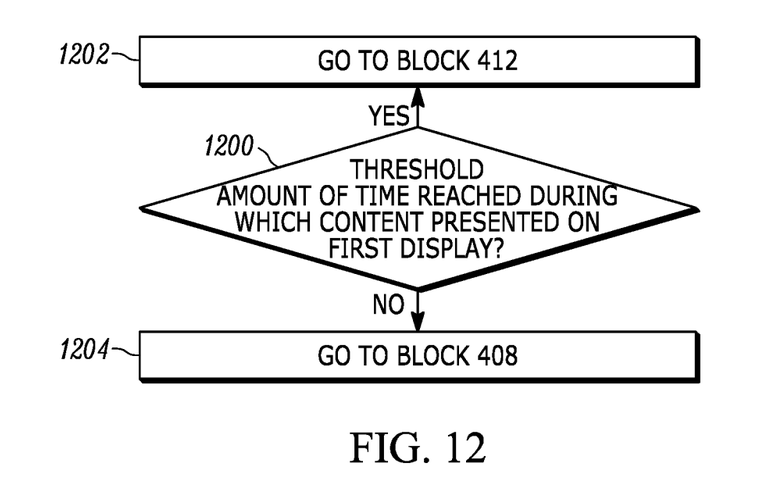

Now describing FIG. 12, at decision diamond 1200 the headset may determine whether a threshold amount of time has expired during which the visual content has been presented on the first display. The headset may use a timer or clock software executing at the headset to track the amount of time the visual content is presented on the first display.

Responsive to an affirmative determination at diamond 1200, the logic may proceed to block 1202. At block 1202 the headset may perform the function of block 412, namely, ceasing to present the visual content on the first display of the headset. However, responsive to a negative determination at diamond 1200, the logic may instead proceed to block 1204. At block 1204 the headset may perform the function of block 408, namely, presenting or continuing to present the visual content on the first display until the threshold amount of time has been reached.

Figure 13:
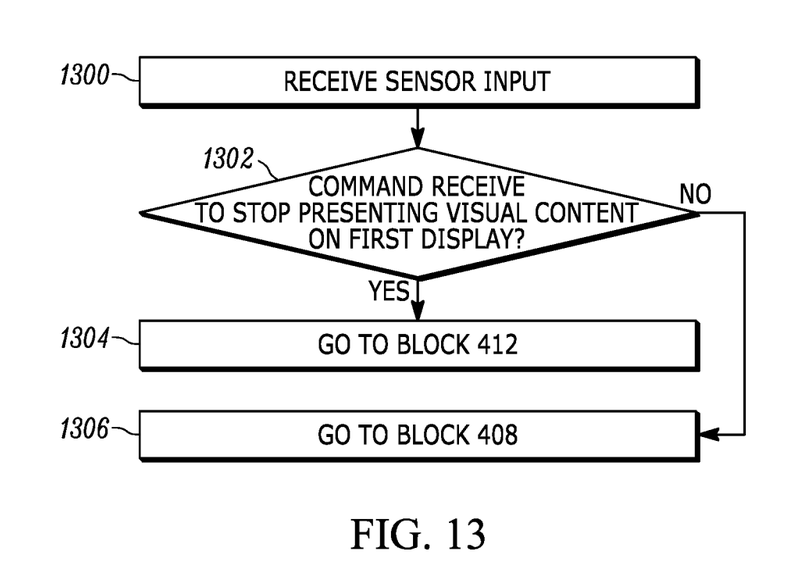

Continuing the detailed description in reference to FIG. 13, it also shows example logic for the headset to determine whether to cease presenting visual content on its display as described herein, Beginning at block 1300, the headset may receive input from a microphone, such as one disposed on the headset itself.

The logic may then proceed to decision diamond 1302 where the headset may determine whether a voice command has been received from the user to cease presenting the visual content on the first display. The headset may do so by analyzing the input from the microphone using voice recognition software to determine whether such a command has been provided.

Responsive to an affirmative determination at diamond 1302, the logic may proceed to block 1304. At block 1304 the headset may perform the function of block 412, namely, ceasing to present the visual content on the first display of the headset. However, responsive to making a negative determination at diamond 1302, the logic may instead proceed to block 1306. At block 1306 where the headset may perform the function of block 408, namely, presenting or continuing to present the visual content on the first display until such a voice command is received.

Figure 14:
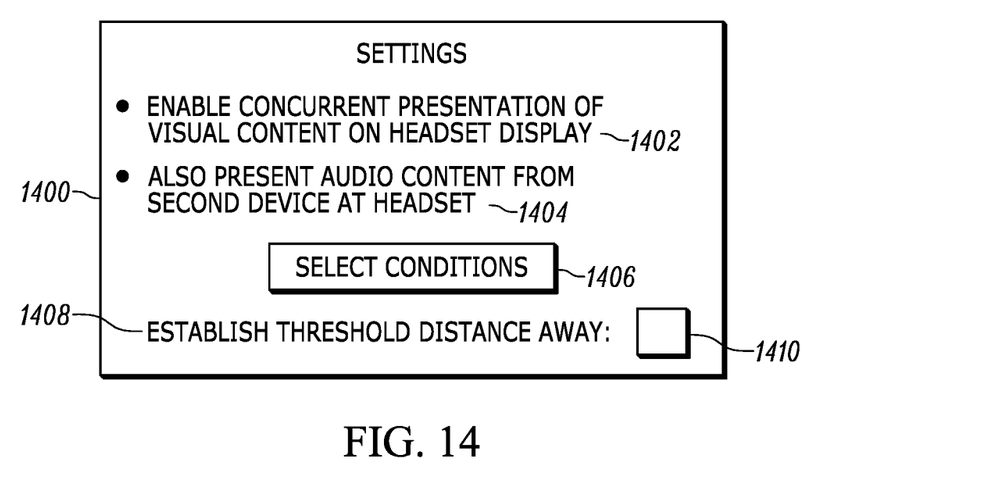
FIG. 14 is an example graphical user interface (GUI) in accordance with present principles.

Reference is now made to FIG. 14, which shows an example graphical user interface (GUI) 1400 presentable on a display of a headset or another display for configuring settings of the headset (or an associated software application) for undertaking present principles. Each of the options to be discussed below may be respectively selected by a user by directing touch or cursor input to an adjacent area of the GUI 1400 presenting a respective radio button for the option, thus selecting the respective radio button.

The GUI 1400 may include a first option 1402 selectable to enable the headset to undertake present principles to present visual content on its display that is already being presented on a different display. For instance, selection of the option 1402 may configure the headset to undertake the logic described above in reference to one or more of FIGS. 4-13.

The GUI 1400 may include a second option 1404 that may be selectable to enable the headset to present audio using speakers located on the headset, with the audio being associated with visual content being or to be presented. This may be performed so that a user might not only view visual content that would otherwise be too far away to view, but also so that the user might be able to readily hear any associated audio content.

Additionally, the GUI 1400 may include a selector 1406 that is selectable using touch or cursor input to select one or more particular conditions for the headset to use in accordance with present principles. For instance, selector 1406 may be selected to command the device to present another GUI at which one or more of the conditions discussed above in relation to FIGS. 4-13 may be listed and selected by the user and hence used by the headset.

In some embodiments, the GUI 1400 may also include a setting 1408 related specifically to the condition of the other device being at least a threshold distance away from the headset. The user may direct text/number input to input box 1410 to specify a particular distance to use as this threshold distance.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed:

1. A headset, comprising:
   a housing;
   at least one processor coupled to the housing;
   a camera coupled to the housing and accessible to the at least one processor;
   an at least partially transparent first display coupled to the housing and accessible to the at least one processor; and
   storage coupled to the housing and accessible to the at least one processor, the storage comprising instructions executable by the at least one processor to:
   receive data from a second device, the second device controlling a second display, the second device being different from the headset, the data from the second device indicating first text;
   identify at least one condition, the at least one condition comprising the first text not matching, to within a threshold confidence level, second text presented on the second display as recognized by the headset using the camera and optical character recognition (OCR);
   based on the first text not matching the second text to within the threshold level of confidence, transmit a request for first content; and
   present, based on receipt of the first content, the first content on the first display, the first content corresponds to second content presented on the second display.

2. The headset of claim 1, wherein the instructions are executable by the at least one processor to:
   identify the at least one condition based on identifying that a graphical object presented on the second display is below a threshold height and/or threshold width in camera pixels as observed by the camera.

3. The headset of claim 1, wherein identification of at least one condition comprises identification of one or more of:
   identification of a predetermined gesture as being gestured by a user and correlated to a command to present the first content on the first display, identification of a voice command from the user as being correlated to a command to present the first content on the first display.

4. The headset of claim 1, wherein identification of the at least one condition comprises identification, based on input from the camera, of a wearer of the headset as not looking at the second display.

5. The headset of claim 1, wherein the at least one condition comprises the headset being at least a predetermined threshold non-zero distance away from the second device, the predetermined threshold non-zero distance being determined using input from an infrared proximity sensor.

6. The headset of claim 1, wherein the instructions are executable by the at least one processor to:
   identify the at least one condition based on identifying that a graphical object presented on the second display is below a threshold height and/or threshold width in image pixels as determined based on input from the camera.

7. The headset of claim 1, wherein a user-designated name of the second device is presented on the first display concurrent with presentation of the first content.

8. The headset of claim 1, wherein the request for the first content is transmitted to one or more of: a server, the second device.

9. A method, comprising:
   receiving, at a first device having a first display, data indicating first text;
   identifying at least one factor, the at least one factor comprising the first text not matching, to within a threshold confidence level, second text as recognized by the first device using optical character recognition (OCR), the second text presented on a second display of a second device, the second display being different from the first display, the first and second devices each selected from the group consisting of: a smartphone, a notebook computer, a tablet computer, a desktop computer, a wearable device, a smart television, a headset, or other computer system;
   based on the first text not matching the second text to within the threshold level of confidence, transmitting a request for first content; and presenting, based on receipt of the first content, the first content on the first display, the first content corresponding to second content presented on the second display.

10. The method of claim 9, comprising:
receiving input from a camera on the first device; and
identifying the at least one factor at least in part by analyzing the input from the camera to determine that a predetermined gesture for presenting content at the first display has been gestured by the user.

11. The method of claim 9, wherein the at least one factor comprises receipt of a voice command to present the first content on the first display, the voice command specifying the first second device by name.

12. The method of claim 9, comprising:
receiving input from a camera on the first device; and
executing the OCR using the input from the camera.

13. The method of claim 9, wherein a designated name of the second device is presented on the first display concurrent with presentation of the first content.

14. At least one computer readable storage medium (CRSM) that is not a transitory signal, the computer readable storage medium comprising instructions executable by at least one processor to:
receive, at a first device controlling a first display, data indicating first text;
identify at least one circumstance, the at least one circumstance comprising the first text not matching, to within a threshold confidence level, second text as recognized by the first device using optical character recognition (OCR), the second text presented on a second display of a second device, the second display being different from the first display, the first and second devices each selected from the group consisting of: a smartphone, a notebook computer, a tablet computer, a desktop computer, a wearable device, a smart television, a headset, or other computer system;
based on the first text not matching the second text to within the threshold level of confidence, transmit a request for first content; and
present, based on receipt of the first content, the first content on the first display, the first content corresponding to second content presented on the second display.

15. The CRSM of claim 14, wherein the at least one circumstance comprises the first device being at least a predetermined threshold non-zero distance away from the second device, the predetermined threshold non-zero distance being determined using input from an infrared proximity sensor.

16. The headset of claim 1, wherein the first content and the second content each comprise video content that is synced for presentation using both the first display and the second display, and wherein timing data is received from a device different from the headset and used to sync the presentation of video content.

17. The headset of claim 16, wherein the timing data is received from a server.

18. The headset of claim 16, wherein the timing data is received from the same device from which the first video content is received.

19. The method of claim 9, wherein the first content and the second content each comprise video content that is synced for presentation using both the first display and the second display, and wherein timing data is received from a device different from the first device and used to sync the presentation of video content.

20. The CRSM of claim 14, wherein the first content comprises first video content, wherein the second content comprises second video content, wherein frames of the first video content are presented on the first display using timing data to sync the frames of the first video content with respective frames of the second video content as presented on the second display, and wherein the timing data specifies particular times at which respective frames of the first video content are to be presented on the first display to sync with the same respective frames of the second video content as presented on the second display.

* * * * *